MULTISECTION ELECTROMECHANICAL BAND PASS FILTER WITH RESONATORS AND TRANSDUCERS MECHANICALLY CONNECTED TOGETHER AND TO THE FILTER BASEPLATE
Original Filed Sept. 26, 1968
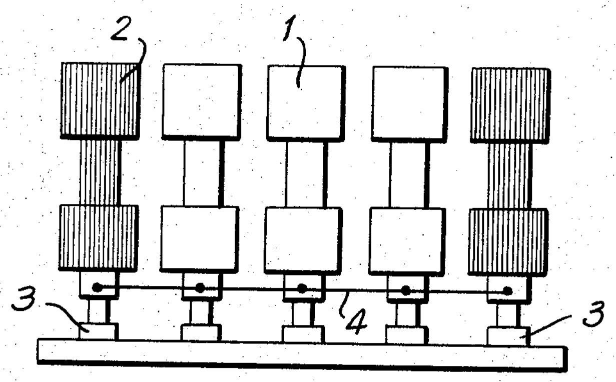

United States Patent Office 3,717,828
Patented Feb. 20, 1973

3,717,828

MULTISECTION ELECTROMECHANICAL BAND PASS FILTER WITH RESONATORS AND TRANSDUCERS MECHANICALLY CONNECTED TOGETHER AND TO THE FILTER BASEPLATE

Natalia Yakovlevna Arleevskaya, Drezdenskaya ulitsa 10, korpus 2, kv. 52; Allanikolievna Kalyaeva, prospekt M. Toreza 102, korpus 5, kv. 177; and Dmitry Vasilievich Pletnev, ulitsa komsomola 10, kv. 26, all of Leningrad, U.S.S.R.

Continuation of abandoned application Ser. No. 762,940, Sept. 26, 1968. This application Apr. 7, 1971, Ser. No. 132,872

Int. Cl. H03h *9/04, 9/26*

U.S. Cl. 333—71 3 Claims

ABSTRACT OF THE DISCLOSURE

A filter is provided with a resonant system which comprises dumbbell shaped resonators, dumbbell shaped ferrite transducers and dumbbell shaped mounting elements. End sections of the mounting elements are connected at respective ends thereof to corresponding end sections of the resonators and transducers. The other end sections of the mounting elements are connected to a baseplate. The mounting elements prevent transmission of the mechanical oscillations from the transducers and resonators to the baseplate. Further provided are wire links directly connected to the mounting elements and providing mechanical connection between the transducers and resonators through the mounting elements.

This application is a continuation of our earlier application Ser. No. 762,940, filed Sept. 26, 1968 and now abandoned.

The present invention relates to the selective transmission of electric waves, and more specifically to a multisection electromechanical filter operating in the frequency range from several kilocycles to several dozen kilocycles, and may be utilized in radio engineering and communications systems for the synthesis of reliable, small-size filters with narrow transmission bands and highly rectangular attenuation-frequency characteristics, and also for the synthesis of systems consisting of a series of filters tuned to different frequencies.

There exists a multi-section electromechanical bandpass filter with dumb-bell resonators, dumb-bell ferrite transducers, wire links attached to the necking portion of the dumb-bell resonators, and cylindrical elements fastening the resonators to a baseplate.

The major disadvantages of such a filter are a marked reduction in the mechanical strength of the resonant system in the frequency range of several kilocycles and the impossibility of obtaining performance of the desired accuracy for the following reasons: firstly, if a filter is to have selectivity, the parasitic coupling between the resonators through the baseplate must be reduced to a minimum, and this requirement in the frequency range of a few kilocycles results in an increase in the linear dimensions of the fastening elements and, as a corollary, in a substantial deterioration of the mechanical strength of the resonant system along with an increase in the linear dimensions of the resonators; secondly, if a filter is to have performance of the desired accuracy, its transmission-band require trimming, and such trimming in the existing type of filter is unfeasible because it leads to a strong de-tuning of the resonators.

A primary object of the present invention is to eliminate the above-mentioned disadvantages.

The invention seeks to provide a reliable small-size highly selective electromechanical filter operating in the frequency range from a few kilocycles to several dozen kilocycles.

This objective is achieved in a multisection filter in which the mounting elements are in the form of bars of a cross-section varying lengthwise, preferably in the shape of dumb-bells, in shunt-type filters, these mounting elements being attached directly to links.

In the frequency range from a few kilocycles to several dozen kilocycles, the electromechanical band-pass filter disclosed herein has shown a performance unattainable by existing filter types.

The use of mounting elements in the form of bars of a cross-secton varying lengthwise, preferably in the shape of dumb-bell, makes to possible to improve the mechanical strength of the system throughout the frequency range involved.

The connection of the mounting elements directly to the links makes it possible to trim the transmission band of the filter and, consequently, to obtain the desired performance.

At any fixed frequency between 5 and 50 kc./s., the electromechanical filter disclosed herein provides for high selectivity within a transmission band variable from 0.02 to 2 percent of the center frequency of the filter.

For a six-section filter, the squareness ratio of the attenuation-frequency characteristic is 1.5 at 3-db and 4-db points, and the selectivity is at least 70 db within 1.5 transmission bands of resonance.

The internal attenuation of the filter disclosed herein is not over 10 db within the transmission band.

The temperature coefficient of frequency does not exceed $\pm 10 \times 10^{-6}$ deg.$^{-1}$ in the temperature range from $-10°$ C. to $+60°$ C.

The invention will be best understood from the following description of a preferred embodiment when read in connection with the accompanying drawing the sole figure of which diagrammatically shows a shunt-type electromechanical band-pass filter with mounting elements in the form of dumb-bells directly attached to links.

Referring to the drawing, there is shown a resonant system of a filter which comprises dumb-bell resonators 1, dumb-bell ferrite transducers 2, and dumb-bell mounting elements 3 directly attached to wire links 4.

The dumb-bell mounting element 3 of each filter resonator except those at the extreme ends, is made integral with the resonator from the same blank. The dumb-bell mounting elements of the extreme resonators are bonded to them by a cement. The wire links are fastened to all mounting elements by welding.

The transmission band can be trimmed either by grinding the mounting elements at their outside diameter (for a reduction in the transmission band), or by welding additional wire links to the respective points on the mounting elements (for an expansion in the transmission band).

The small-size multi-section electromechanical bandpass filter disclosed herein can be constructed for any frequency from 5 to 50 kc./s. and with the desired accuracy of performance.

The mechanical system of the filter can be readily retuned in the course of filter manufacture, which is important when a series of filters tuned to different frequencies are to be produced.

In the frequency range discussed, the filter components can be standardized.

We claim:

1. A multi-section electromechanical band-pass filter comprising a baseplate; transducers disposed at the filter inlet and outlet; three-section dumbbell shaped resonators arranged parallel to one another; mounting elements comprising two end sections and a middle section which interconnects said end sections so that each of said mounting elements is dumbbell shaped; said end sections of said mounting elements being connected at respective ends thereof to corresponding end sections of said resonators and transducers; the other of said end sections being connected at their respective ends to said baseplate; said mounting elements preventing transmission of mechanical oscillations from said transducers and resonators to said baseplate; and wire links directly connected to the mounting elements and providing mechanical connection between said transducers and resonators through said mounting elements.

2. A band-pass filter as claimed in claim 1 wherein said wire links are connected to the mounting elements at the side surfaces of all of those end sections of the mounting elements which are directly connected to the transducers and resonators.

3. A band-pass filter as claimed in claim 2 wherein said transducers are of dumbbell shape and are parallel to said resonators.

References Cited

UNITED STATES PATENTS

| | | | |
|---|---|---|---|
| 3,304,785 | 2/1967 | Börner | 310—26 X |
| 3,225,226 | 12/1965 | Kawakami | 310—8.3 X |
| 2,406,767 | 9/1946 | Hayes | 310—8.3 UX |
| 2,753,529 | 7/1956 | Maron et al. | 333—71 |
| 2,803,803 | 8/1957 | Jonker et al. | 333—72 |
| 2,810,888 | 10/1957 | George et al. | 310—26 X |
| 2,870,521 | 1/1959 | Rudnick | 333—72 |
| 2,969,511 | 1/1961 | Börner | 333—71 |
| 3,013,228 | 12/1961 | Kettel et al. | 333—71 |
| 3,389,351 | 6/1968 | Trzeba et al. | 333—71 |

FOREIGN PATENTS

| | | | |
|---|---|---|---|
| 1,191,702 | 10/1959 | France | 333—71 |
| 947,145 | 1/1964 | Great Britain | 333—71 |
| 141,959 | 1960 | U.S.S.R. | 333—71 |
| 846,999 | 9/1960 | Great Britain | 333—71 |
| 1,196,729 | 7/1970 | Great Britain | 333—71 |

OTHER REFERENCES

Struszynski, W., "A Theoretical Analysis of the Torsional Electromechanical Filters," Marconi Review, vol. 22, 1959, pp. 119–143.

Russen, A., "Electromechanical Filters for 50 to 500 Kilohertz," Electrical Communication, vol. 39, 1964, pp. 423–434.

Albsmeier, Von H., "Mechanische Bandpässe Mit Mechanisch Erzeughten, Frei Wählbaren Dämpfungspolen," Frequenz BD 17, 1963, pp. 442–448.

Schübler, Von H., "Mechnische Filter Mit Piezoelektrischen Wandlern," Telefunken-Zeitung Jg 39, 1966, pp. 429–439.

George, R. W., Electromechanica Filters For 100 kc Carrier and Sideband Selection," IRE Proc. 1–1956, pp. 14–18.

HERMAN K. SAALBACH, Primary Examiner

W. H. PUNTER, Assistant Examiner

U.S. Cl. X.R.

310—8.3